United States Patent
Choi et al.

(10) Patent No.: US 9,825,548 B2
(45) Date of Patent: Nov. 21, 2017

(54) ADAPTIVE TURN-OFF TRIGGER BLANKING FOR SYNCHRONOUS RECTIFICATION

(71) Applicant: FAIRCHILD SEMICONDUCTOR CORPORATION, Sunnyvale, CA (US)

(72) Inventors: Hangseok Choi, Bedford, NH (US); Lei Chen, San Jose, CA (US); Cheng-Sung Chen, Hsinchu (TW)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 0 days.

(21) Appl. No.: 15/358,424

(22) Filed: Nov. 22, 2016

(65) Prior Publication Data

US 2017/0222568 A1 Aug. 3, 2017

Related U.S. Application Data

(60) Provisional application No. 62/290,165, filed on Feb. 2, 2016.

(51) Int. Cl.
| | |
|---|---|
| *H02M 7/217* | (2006.01) |
| *H02M 3/335* | (2006.01) |
| *H02M 1/08* | (2006.01) |
| *H02M 1/00* | (2006.01) |

(52) U.S. Cl.
CPC ......... *H02M 3/33592* (2013.01); *H02M 1/08* (2013.01); *H02M 2001/0032* (2013.01); *H02M 2001/0048* (2013.01)

(58) Field of Classification Search
CPC ............. H02M 3/335; H02M 3/33523; H02M 3/33569; H02M 3/33576; H02M 3/33592; H02M 7/217
See application file for complete search history.

(56) References Cited

U.S. PATENT DOCUMENTS

| | | | |
|---|---|---|---|
| 7,199,636 B2 | 4/2007 | Oswald et al. | |
| 7,212,418 B1 * | 5/2007 | Hsu ................... | H02M 3/33592 363/127 |
| 7,408,796 B2 * | 8/2008 | Soldano ............ | H02M 3/33592 363/127 |
| 2012/0176827 A1 * | 7/2012 | Malinin ............ | H02M 3/33592 363/127 |
| 2015/0214851 A1 * | 7/2015 | Lin ................... | H02M 3/33592 363/21.14 |

(Continued)

OTHER PUBLICATIONS

FAN501A—Offline DCM/CCM Flyback PWM Controller for Charger Applications, 2014, pp. 1-16, Fairchild Semiconductor Corporation.

(Continued)

*Primary Examiner* — Gary L Laxton
(74) *Attorney, Agent, or Firm* — Okamoto & Benedicto LLP (57) ABSTRACT

A switching converter includes a synchronous rectifier and a synchronous rectifier driver that controls conduction of the synchronous rectifier. The synchronous rectifier driver turns OFF the synchronous rectifier in response to a turn-off trigger. The synchronous rectifier driver prevents the turn-off trigger from turning OFF the synchronous rectifier during a turn-off trigger blanking time that is adaptively set based on a conduction time of the synchronous rectifier.

20 Claims, 8 Drawing Sheets

(56) References Cited

U.S. PATENT DOCUMENTS

2015/0318790 A1* 11/2015 Tichy ............... H02M 3/33592
363/21.14

OTHER PUBLICATIONS

FAN6204—nWSaver Synchronous Rectification Controller for Flyback and Forward Freewheeling Rectification, 2012, pp. 1-14, Fairchild Semiconductor Corporation.
AN6204—FAN6204 Synchronous Rectification Controller for Flyback and Forward Freewheeling Rectification, 2011, pp. 1-8, Fairchild Semiconductor Corporation.
Linear Technology LT8309—Secondary-Side Synchronous Rectifier Driver, pp. 1-14 [retrieved on Jan. 8, 2016], retrieved from the internet: www.linear.com/LT8309.

* cited by examiner

ADAPTIVE TURN-OFF TRIGGER BLANKING FOR SYNCHRONOUS RECTIFICATION

CROSS-REFERENCE TO RELATED APPLICATION

This application claims the benefit of U.S. Provisional Application No. 62/290,165, filed on Feb. 2, 2016, which is incorporated herein by reference in its entirety.

BACKGROUND OF THE INVENTION

1. Field of the Invention

The present invention relates generally to electrical circuits, and more particularly but not exclusively to synchronous rectifiers.

2. Description of the Background Art

Rectifier diodes are employed in switching converters, such as flyback converters. Generally speaking, a flyback converter is a buck-boost converter where the output inductor is split to form a transformer. In a flyback converter, a primary-side switch is closed to connect the primary winding of the transformer to an input voltage source. Closing the primary-side switch increases the primary current and magnetic flux, stores energy in the transformer, and induces current on the secondary winding of the transformer. The induced current has a polarity that places a diode rectifier in reverse bias to block charging of an output capacitor. When the primary-side switch is opened, the primary current and magnetic flux drop, and the current on the secondary winding changes polarity to thereby forward bias the diode rectifier and allow charging of the output capacitor to generate a DC output voltage.

Many flyback converters employ diode rectifiers to generate the DC output voltage. The conduction loss of a diode rectifier contributes significantly to overall power loss, especially for low-voltage, high-current converter applications. The conduction loss of a diode rectifier is given by the product of its forward voltage drop and forward conduction current. By replacing the diode rectifier with a metal-oxide semiconductor field effect transistor (MOSFET) operated as a synchronous rectifier, the equivalent forward voltage drop can be lowered and, consequently, the conduction loss can be reduced. Unlike a diode rectifier, however, the conduction of the synchronous rectifier has to be actively controlled by additional circuit, such as a synchronous rectifier driver.

SUMMARY

In one embodiment, a switching converter includes a synchronous rectifier and a synchronous rectifier driver that controls conduction of the synchronous rectifier. The synchronous rectifier driver turns OFF the synchronous rectifier in response to a turn-off trigger. The synchronous rectifier driver prevents the turn-off trigger from turning OFF the synchronous rectifier during a turn-off trigger blanking time that is adaptively set based on a conduction time of the synchronous rectifier.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
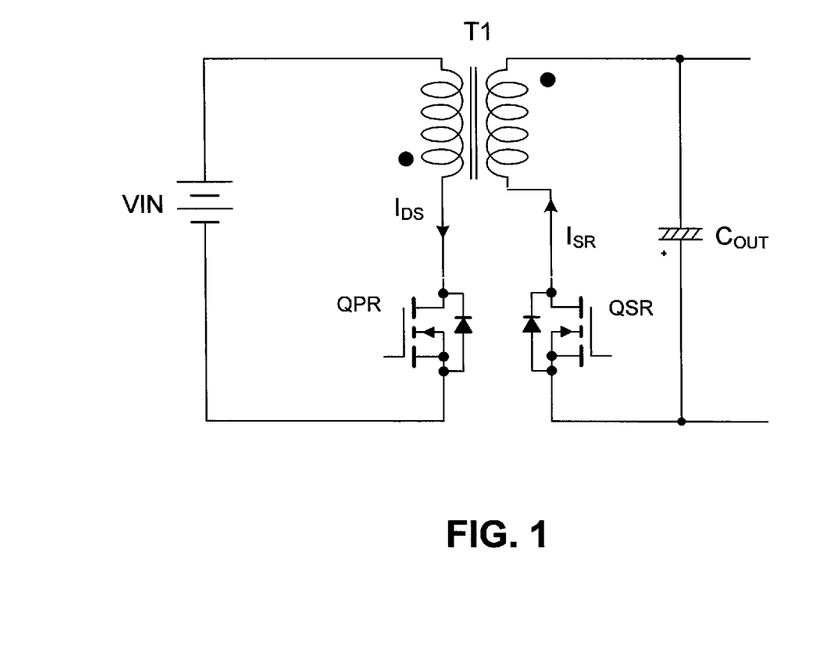
FIG. 1 shows a schematic diagram of a flyback converter that may take advantage of embodiments of the present invention.

FIG. 1 shows a schematic diagram of a flyback converter that may take advantage of embodiments of the present invention. In the example of FIG. 1, the flyback converter includes a primary-side switch QPR, a synchronous rectifier QSR, a transformer T1, and an output capacitor COUT. In one embodiment, each of the primary-side switch QPR and the synchronous rectifier QSR comprises a MOSFET.

When the primary-side switch QPR is turned ON, the primary winding of the transformer T1 is connected to the input voltage source VIN, resulting in a current IDS flowing through the primary-side switch QPR and the primary winding. When the primary-side switch QPR is turned OFF, the energy stored in the primary side winding is released to the secondary winding of the transformer T1. The induced current in the secondary winding turns ON the body diode of the synchronous rectifier QSR and a current ISR flows through the secondary winding to charge the output capacitor COUT. The synchronous rectifier QSR turns ON at onset of body diode conduction, thereby minimizing the forward voltage drop across the synchronous rectifier QSR by providing a low impedance current path in parallel with its body diode. To prevent current inversion, the synchronous rectifier QSR is turned OFF before the synchronous rectifier current ISR reaches zero.

Figure 2:
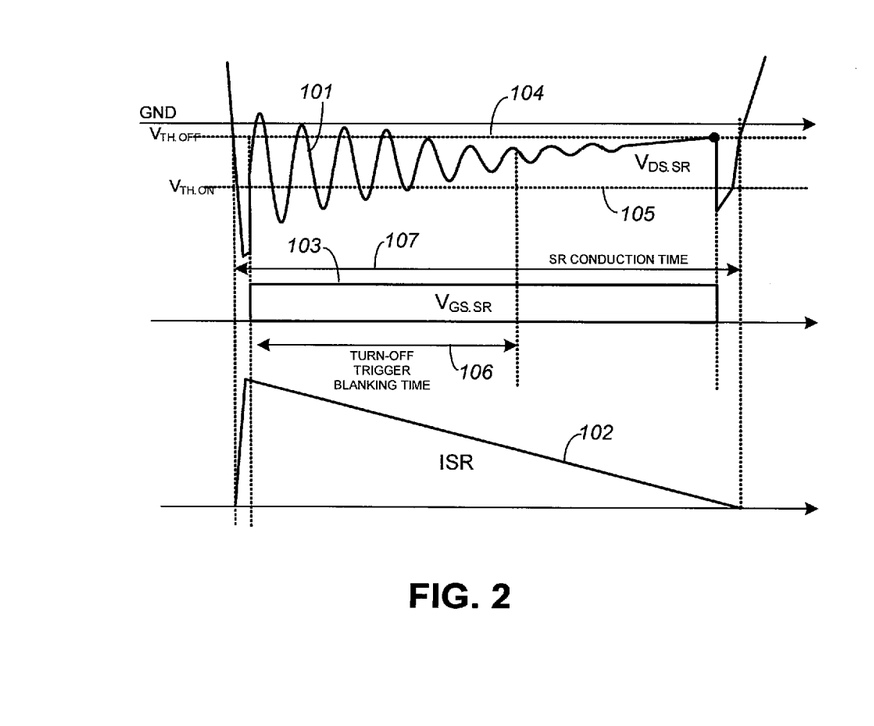
FIGS. 2 and 3 show waveforms of signals of a synchronous rectifier at heavy load condition and light load condition, respectively, when a fixed turn-off trigger blanking time is used.
Figure 3:
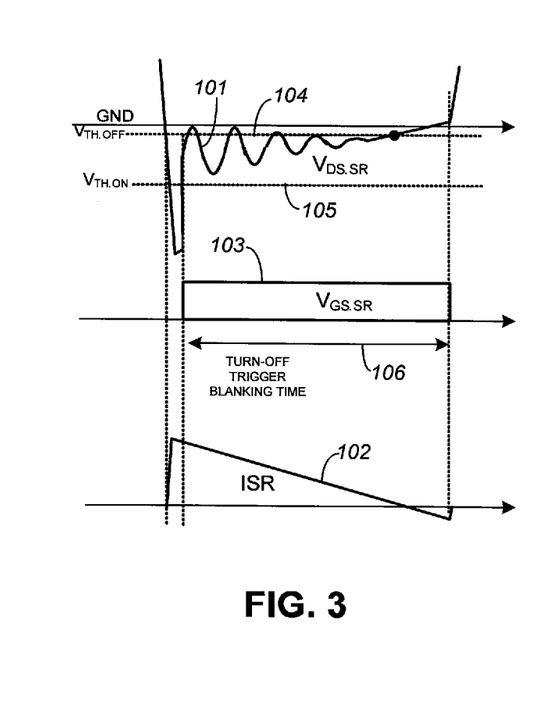

FIGS. 2 and 3 show waveforms of signals of a synchronous rectifier at heavy load condition and light load condition, respectively, when a fixed turn-off trigger blanking time is used. FIGS. 2 and 3 show waveforms of the drain-to-source voltage VDS.SR (see 101) of the synchronous rectifier, the synchronous rectifier current ISR (see 102) through the synchronous rectifier, and the gate-to-source voltage VGS.SR (see 103) of the synchronous rectifier. FIGS. 2 and 3 also show the turn-off threshold VTH.OFF (see 104) and the turn-on threshold VTH.ON (see 105) of the synchronous rectifier. The synchronous rectifier turns ON when its drain-to-source voltage VDS.SR drops below the turn-on threshold VTH.ON, which is caused by conduction of body diode of the synchronous rectifier. Note that the conduction time of the synchronous rectifier begins with body diode conduction, not necessarily when the gate drive signal to the synchronous rectifier is asserted.

In one embodiment, the turn-off trigger for turning OFF the synchronous rectifier is its drain-to-source voltage VDS.SR becoming greater than the turn-off threshold VTH.OFF. More particularly, as the synchronous rectifier current ISR reaches zero, the drain-to-source voltage VDS.SR of the synchronous rectifier rises above the turn-off threshold VTH.OFF, thereby turning OFF the synchronous rectifier. After the synchronous rectifier turns OFF, the synchronous rectifier current ISR flows through the body diode and the body diode becomes reverse biased when the synchronous rectifier current ISR reaches zero.

As illustrated in FIG. 2, the drain-to-source voltage VDS.SR (see 101) of the synchronous rectifier severely oscillates after the synchronous rectifier turns ON. Because of this switching noise, there is a period after the synchronous rectifier turns ON when the drain-to-source voltage VDS.SR can exceed the turn-off threshold VTH.OFF, thereby causing the synchronous rectifier to prematurely turn OFF during its conduction time. To prevent this from occurring, a turn-off trigger blanking time (see 106) is provided during which the synchronous rectifier is not turned-OFF regardless of the level of its drain-to-source voltage VDS.SR relative to the turn-off threshold VTH.OFF. That is, the turn-off trigger is blanked, i.e., disabled, during the turn-off trigger blanking time. The turn-off trigger blanking time represents the minimum conduction time, i.e., ON time, of the synchronous rectifier. In the example of FIG. 2, the turn-off trigger blanking time (see 106) is shorter than the conduction time of the synchronous rectifier (see 107). In a typical SR driver integrated circuit (IC), a dedicated pin is required to program the turn-off trigger blanking time.

FIG. 3 shows the waveforms of FIG. 2 at light load condition. Generally speaking, it is relatively difficult to select an optimal turn-off trigger blanking time. A turn-off trigger blanking time that is too long can cause synchronous rectifier current inversion at light load condition, deteriorating efficiency when the synchronous rectifier conduction time is short relative to the turn-off trigger blanking time. On the other hand, a turn-off trigger blanking time that is too short cannot effectively blank the switching noise on the drain-to-source voltage VDS.SR at heavy load condition.

Generally speaking, more switching noise is induced at heavy load condition, while less switching noise is induced at light load condition. In one embodiment, to obtain an efficient turn-off trigger blanking time and avoid problems associated with a fixed turn-off trigger blanking time, the turn-off trigger blanking time of the synchronous rectifier is adjusted to adapt to the load condition. The turn-off trigger blanking time may be introduced after the gate drive signal turns ON the synchronous rectifier. During the turn-off trigger blanking time, the turn-off trigger for turning OFF the synchronous rectifier is blanked to prevent the turn-off trigger from prematurely turning OFF the synchronous rectifier.

Figure 4:
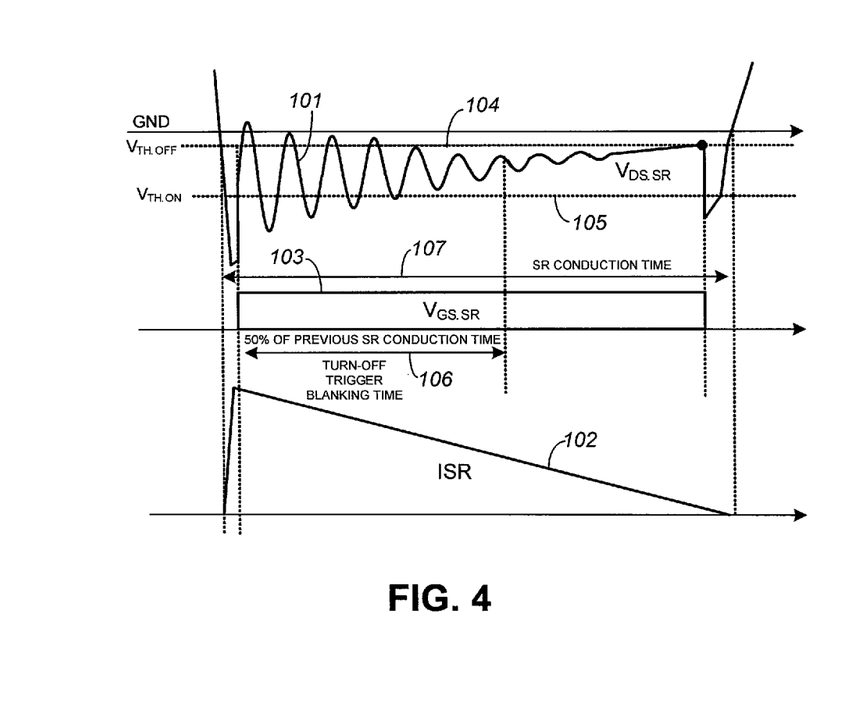
FIGS. 4 and 5 show waveforms of signals of a synchronous rectifier at heavy load condition and light load condition, respectively, in accordance with an embodiment of the present invention.
Figure 5:
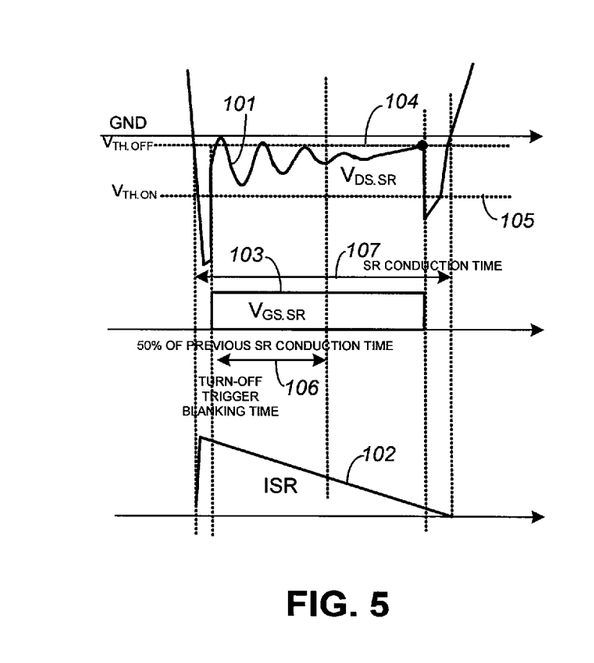

FIGS. 4 and 5 show waveforms of signals of a synchronous rectifier at heavy load condition and light load condition, respectively, in accordance with an embodiment of the present invention. In the example of FIGS. 4 and 5, the turn-off trigger blanking time (FIGS. 4 and 5, see 106) is adaptively set to be equal to a fraction of the synchronous rectifier conduction time in the previous switching cycle. More particularly, in one embodiment, the waveforms of FIGS. 4 and 5 are the same as those of FIGS. 2 and 3, respectively, except that the turn-off trigger blanking time is adaptively set to be 50% of the synchronous rectifier conduction time in the previous switching cycle.

Figure 6:
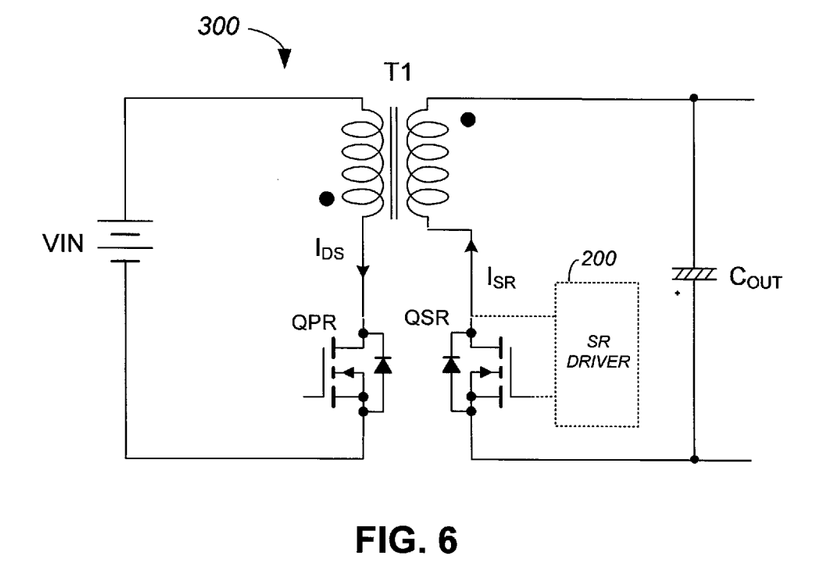
FIG. 6 shows a schematic diagram of a switching converter in accordance with an embodiment of the present invention.

FIG. 6 shows a schematic diagram of a switching converter circuit in accordance with an embodiment of the present invention. In the example of FIG. 6, the switching converter is a flyback converter 300, which is the same as that of FIG. 1 with the addition of a synchronous rectifier (SR) driver 200. The other components of the flyback converter 300 of FIG. 6 are as described with reference to FIG. 1.

Figure 7:
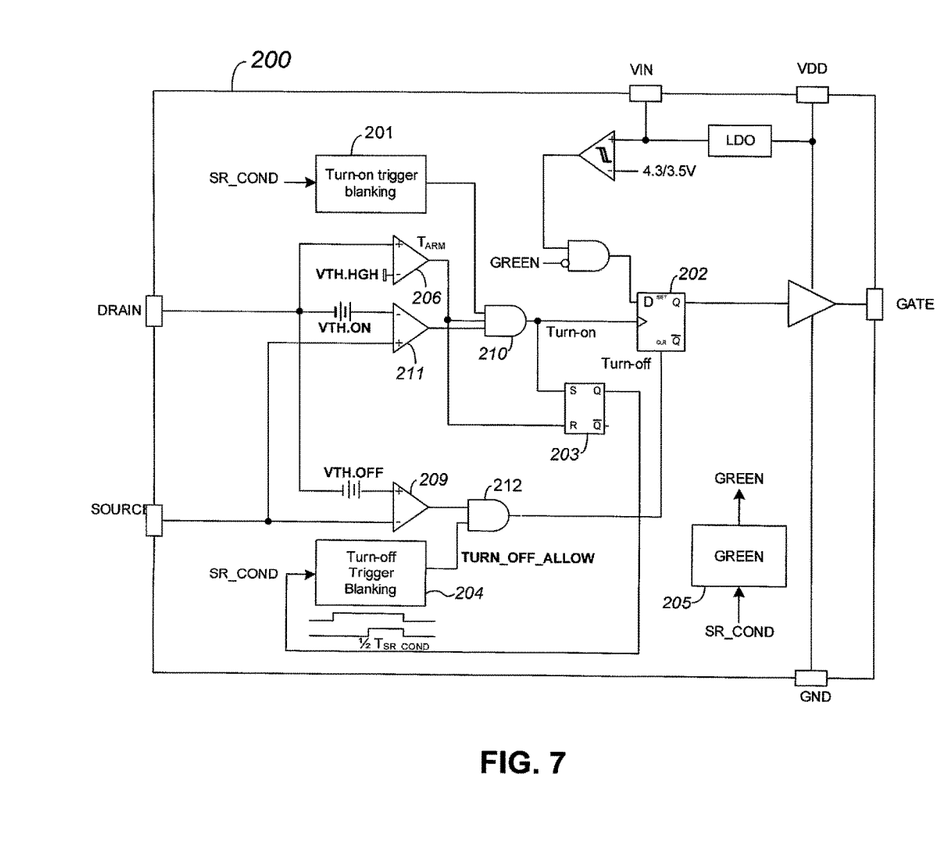
FIG. 7 shows a schematic diagram of a synchronous rectifier driver in accordance with an embodiment of the present invention.

FIG. 7 shows a schematic diagram of the SR driver 200 in accordance with an embodiment of the present invention. In the example of FIG. 7, the SR driver 200 is implemented as an integrated circuit with a DRAIN pin for connecting to a drain of the synchronous rectifier QSR, a SOURCE pin for connecting to a source of the synchronous rectifier QSR, a GND pin for connecting to a ground reference, a GATE pin for connecting to the gate of the synchronous rectifier QSR, a VDD pin for receiving a supply voltage, and a VIN pin for receiving an input voltage source. In the example of FIG. 7, the SR driver 200 includes a green circuit 205 for minimizing standby power consumption by shutting down the gate drive signal to the synchronous rectifier QSR when the synchronous rectifier conduction time, which may be detected from an SR_COND signal, is shorter than a predetermined threshold.

Figure 8:
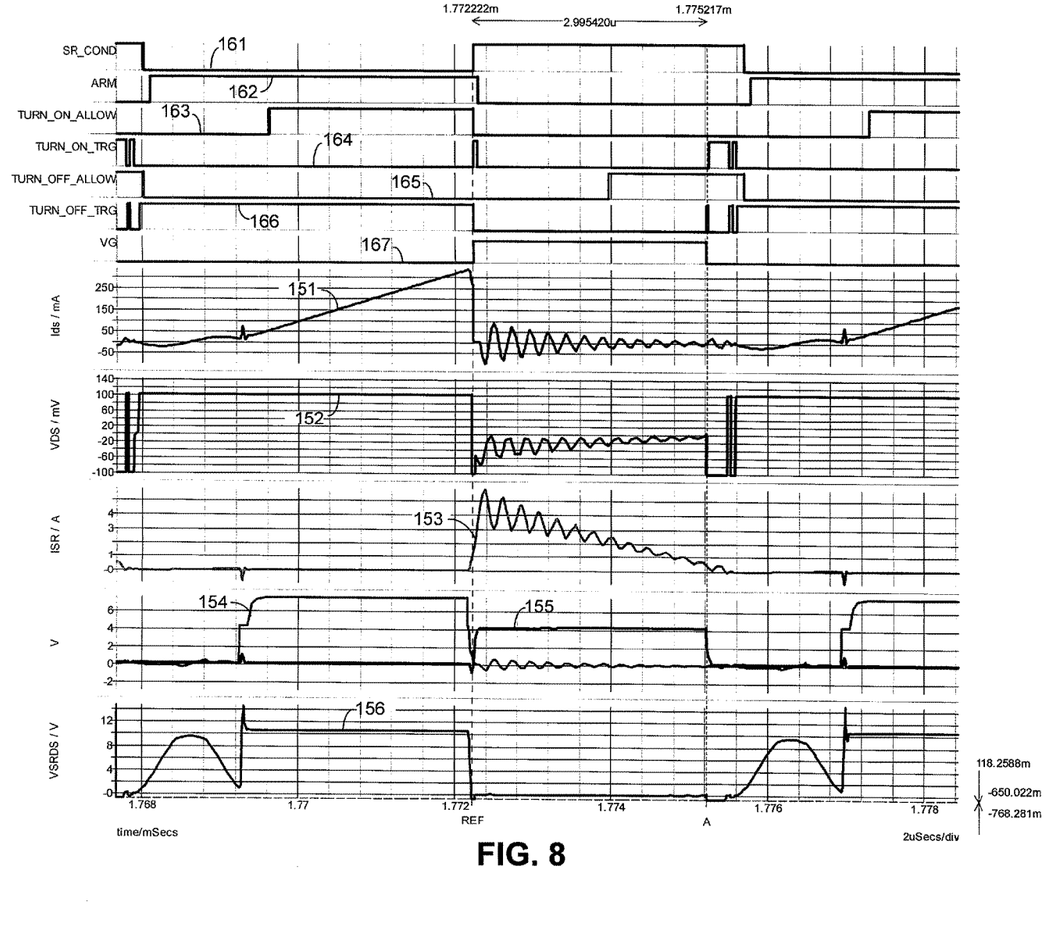
FIG. 8 shows waveforms of signals of a flyback converter in accordance with an embodiment of the present invention.

FIG. 8 shows waveforms of signals of the flyback converter 300 in accordance with an embodiment of the present invention. With reference to FIGS. 6 and 7, FIG. 8 shows waveforms of the SR_COND signal (see 161) that is output by a set/reset latch 203, an ARM signal (see 162) that is output by an amplifier 206, a TURN_ON_ALLOW signal (see 163) that is output by a turn-on trigger blanking circuit 201 (e.g., fixed blanking time of 1 μs), a TURN_ON_TRG signal (see 164) that is output by an AND gate 210, a TURN_OFF_ALLOW signal (see 165) that is output by a turn-off trigger blanking circuit 204, a TURN_OFF_TRG signal (see 166) that is output by an AND gate 212, and a gate drive signal (see 167) at the GATE pin of the synchronous rectifier QSR. In the example of FIG. 8, the turn-off trigger blanking time (indicated by the TURN_OFF_ALLOW signal) is adaptively selected to be 50% of the detected conduction time of the synchronous rectifier QSR in the previous switching cycle. Advantageously, because the turn-off trigger blanking time is adaptively selected, the integrated circuit package of the SR driver 200 does not need a dedicated pin for programming the turn-off trigger blanking time.

FIG. 8 further shows waveforms of the current IDS through the primary-side switch QPR (see 151), the voltage from the DRAIN pin to the SOURCE pin (see 152), the synchronous rectifier current ISR through the synchronous rectifier QSR (see 153), the gate drive signal to the primary-side switch QPR (see 154) relative to the gate drive signal to the synchronous rectifier QSR (see 155), and the drain-to-source voltage VSR.DS of the synchronous rectifier (see 156). It is to be noted that the voltage from the DRAIN pin to the SOURCE pin of the SR driver 200 is not exactly the same as the drain-to-source voltage VSR.DS of the synchronous rectifier because of stray inductance on the drain of the synchronous rectifier QSR.

In one embodiment, the turn-off trigger blanking time (FIG. 8, see 165) is introduced after the gate drive signal (FIG. 8, see 167) is asserted to turn ON the synchronous rectifier QSR. This results in the turn-off trigger blanking time being extended for an adaptively-set period of time to prevent the synchronous rectifier QSR from being turned OFF by switching noise that occurs after the synchronous rectifier QSR is turned ON.

Referring to FIG. 7, the SR driver 200 detects the drain-to-source voltage of the synchronous rectifier QSR from the DRAIN and SOURCE pins. The amplifier 211 compares the drain-to-source voltage VDS.SR of the synchronous rectifier to the turn-on threshold VTH.ON to detect the start of body diode conduction. When the amplifier 211 detects that the body diode of the synchronous rectifier QSR starts to conduct, the amplifier 211, through the AND gate 210, clocks the flip-flop 202 to assert the gate drive signal at the GATE pin and thereby turn ON the synchronous rectifier QSR. This advantageously minimizes power loss by conducting through the channel, instead of the body diode, of the synchronous rectifier QSR. The amplifier 206 compares the drain-to-source voltage VDS.SR of the synchronous rectifier QSR to a high threshold VTH.HGH to detect end of body diode conduction. When the amplifier 206 detects end of body diode conduction, the amplifier 206 resets the set/reset latch 203 to de-assert the SR_COND signal.

Still referring to FIG. 7, the SR_COND signal is output by the set/reset latch 203. The SR_COND signal is received by the turn-off trigger blanking circuit 204 to generate a turn-off trigger blanking signal, which disables the AND gate 212 to prevent resetting of the gate drive signal to the synchronous rectifier QSR. More particularly, in the example of FIG. 7, the turn-off trigger is when the drain-to-source voltage VDS.SR of the synchronous rectifier QSR, as detected from the DRAIN pin and SOURCE pin, exceeds the turn-off threshold VTH.OFF. When the drain-to-source voltage VDS.SR of the synchronous rectifier QSR rises above the turn-off threshold VTH.OFF, the amplifier 209 generates an output signal that clears the flip-flop 202 to de-assert the gate drive signal at the GATE pin and thereby turn OFF the synchronous rectifier QSR. The turn-off trigger blanking circuit 204 outputs a turn-off trigger blanking signal that gates, i.e., enables/disables, the AND gate 212 to prevent the turn-off trigger from turning OFF the synchronous rectifier QSR during the turn-off trigger blanking time. In one embodiment, the turn-off trigger blanking circuit 204 generates the turn-off trigger blanking signal by charging a timing capacitor during the synchronous rectifier conduction time. The peak of the timing capacitor is sampled and held. Half of the sampled signal may be compared with the timing capacitor voltage to generate the turn-off trigger blanking signal.

Figure 9:
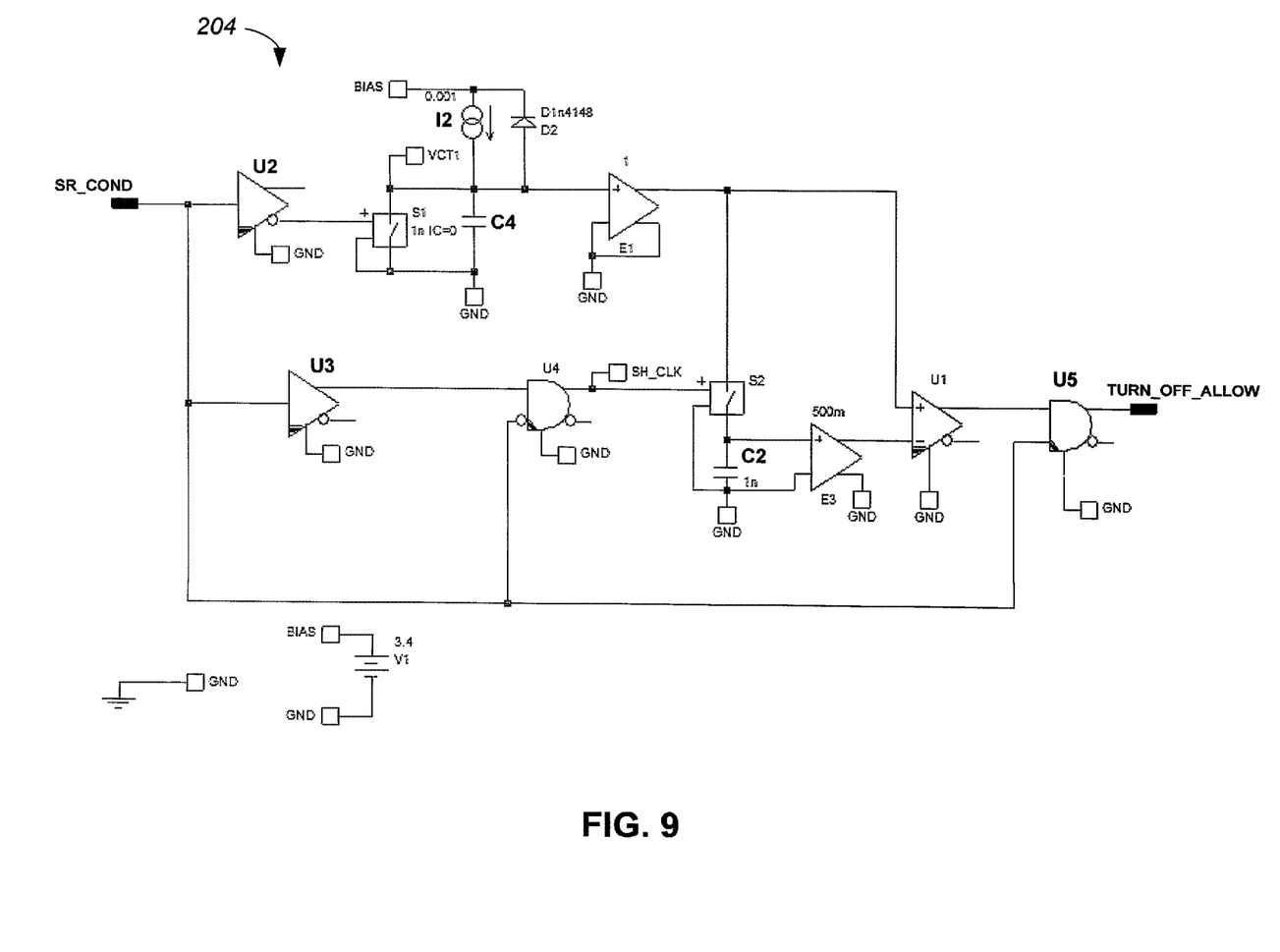
FIG. 9 shows a schematic diagram of a turn-off trigger blanking circuit in accordance with an embodiment of the present invention.

FIG. 9 shows a schematic diagram of a turn-off trigger blanking circuit 204 in accordance with an embodiment of the present invention. In the example of FIG. 9, the SR_COND signal is delayed by a delay circuit U2 (e.g., 30 ns delay) and a delay circuit U3 (e.g., 20 ns delay) to ensure proper sample and hold. A timing capacitor C4 is charged by a current source 12 according to the SR_COND signal. The peak voltage of the timing capacitor C4 is proportional to the synchronous rectifier conduction time for each switching cycle. The peak value of the timing capacitor C4 voltage is sampled and stored in a capacitor C2. Then, half of the voltage on the capacitor C2 is compared to the voltage on the timing capacitor C4 in the next switching cycle to generate the TURN_OFF_ALLOW signal. The TURN_OFF_ALLOW signal rising edge is delayed from the SR_COND signal rising edge by half of the synchronous rectifier conduction time of the previous switching cycle. The TURN_OFF_ALLOW signal, i.e., the turn-off trigger blanking signal, is output by the gate U5.

Figure 10:
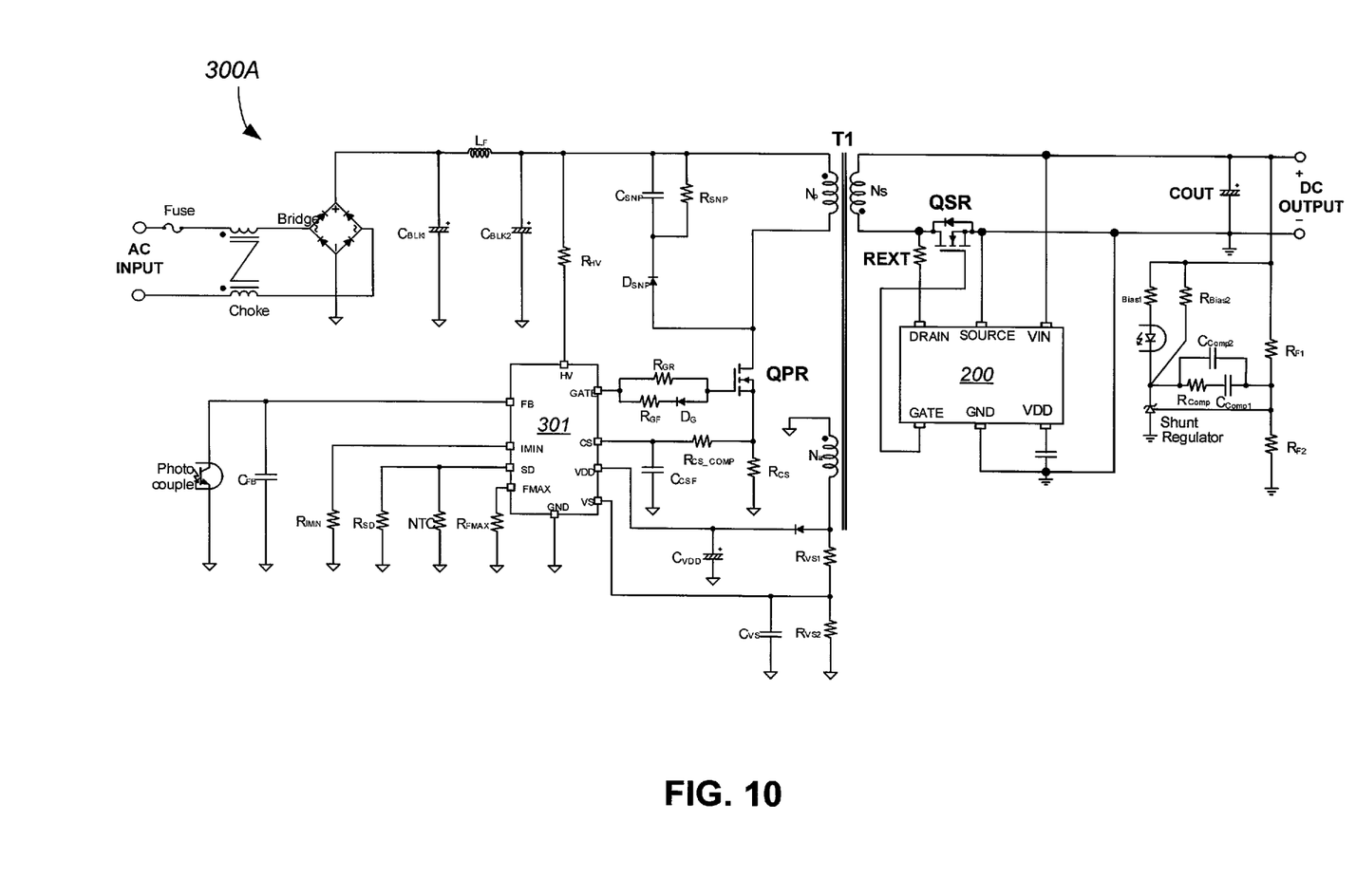
FIG. 10 shows a schematic diagram of a flyback converter in accordance with an embodiment of the present invention.

FIG. 10 shows a schematic diagram of a flyback converter 300A in accordance with an embodiment of the present invention. The flyback converter 300A is a particular embodiment of the flyback converter 300 of FIG. 6. The flyback converter 300A comprises previously discussed components, namely the transformer T1, the primary-side switch QPR, the synchronous rectifier QSR, and the SR driver 200. The flyback converter 300A receives, filters, and rectifies an AC input to generate an input voltage across the primary winding of the transformer T1. In the example of FIG. 10, the flyback converter 300A includes a controller IC 301 for controlling the switching operation of the primary-side switch QPR by, e.g., pulse-width modulation (PWM), on the primary side of the transformer T1. The SR driver 200 controls the conduction of the synchronous rectifier QSR on the secondary side.

In one embodiment, the integrated circuit package of the SR driver 200 comprises a plurality of pins. The integrated circuit package of the SR driver 200 includes a DRAIN pin that is connected to the drain of the synchronous rectifier QSR, a SOURCE pin that is connected to the source of the synchronous rectifier QSR, and a GATE pin that is connected to the GATE of the synchronous rectifier QSR. In the example of FIG. 10, the DRAIN pin is connected to the drain of the synchronous rectifier QSR by way of an external resistor REXT. With adaptive turn-off trigger blanking, the integrated circuit package of the SR driver 200 does not have a dedicated pin for programming the turn-off trigger blanking time.

Circuits and methods of switching converters with adaptive turn-off trigger blanking have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A switching converter circuit comprising:
   a transformer;
   a synchronous rectifier that is connected to a secondary winding of the transformer; and
   a synchronous rectifier (SR) driver in an integrated circuit (IC) package, the IC package comprising a DRAIN pin connected to a drain of the synchronous rectifier, a SOURCE pin connected to a source of the synchronous rectifier, and a GATE pin connected to a gate of the synchronous rectifier, the SR driver being configured to turn OFF the synchronous rectifier in response to a turn-off trigger, to prevent the turn-off trigger from turning OFF the synchronous rectifier during a turn-off trigger blanking time, and to adaptively set the turn-off trigger blanking time based on a conduction time of the synchronous rectifier.

2. The switching converter circuit of claim 1, wherein the synchronous rectifier driver is configured to set the turn-off trigger blanking time as 50% of the conduction time of the synchronous rectifier.

3. The switching converter circuit of claim 1, wherein the switching converter comprises a flyback converter.

4. The switching converter circuit of claim 1, further comprising a primary-side switch that is connected to a primary winding of the transformer.

5. The switching converter circuit of claim 1, wherein the turn-off trigger is an output signal of an amplifier indicating that a drain-to-source voltage of the synchronous rectifier exceeds a turn-off threshold.

6. The switching converter circuit of claim 5, wherein the synchronous rectifier driver comprises a turn-off trigger blanking circuit that generates a turn-off trigger blanking signal that blanks the output signal of the amplifier during the turn-off trigger blanking time.

7. The switching converter circuit of claim 6, wherein the output signal of the amplifier is input to an AND gate and the turn-off trigger blanking signal is another input to the AND gate.

8. The switching converter of claim 6, wherein the turn-off trigger blanking circuit comprises:
   a first capacitor that is charged during the conduction time of the synchronous rectifier in a first switching cycle;
   a second capacitor that stores a peak of a charge stored in the first capacitor in the first switching cycle; and
   a comparator circuit that compares half of a charge stored in the second capacitor to a charge stored in the first capacitor in a second switching cycle that follows the first switching cycle.

9. A synchronous rectifier (SR) driver comprising:
   a first node that is configured to be connected to a drain of a synchronous rectifier, a second node that is configured to be connected to a source of the synchronous rectifier, and a third node that is configured to be connected to a gate of the synchronous rectifier;
   a first circuit that is configured to turn OFF the synchronous rectifier based on a level of a drain-to-source voltage of the synchronous rectifier; and
   a second circuit that is configured to prevent the first circuit from turning OFF the synchronous rectifier during a turn-off trigger blanking time having a duration that is based on a conduction time of the synchronous rectifier.

10. The SR driver of claim 9, wherein the second circuit is configured to adaptively set the duration of the turn-off trigger blanking time to be 50% of the conduction time of the synchronous rectifier.

11. The SR driver of claim 9, wherein the first, second, and third nodes of the SR driver are pins of an integrated circuit package of the SR driver.

12. The SR driver of claim 9, wherein the first circuit comprises:
   an amplifier that is configured to generate a turn-off trigger signal based on a comparison of the drain-to-source voltage of the synchronous rectifier to a turn-off threshold.

13. The SR driver of claim 12, wherein the second circuit comprises:
   a turn-off trigger blanking circuit that generates a turn-off trigger blanking signal that disables the turn-off trigger signal during the turn-off trigger blanking time.

14. The SR driver of claim 13, wherein the turn-off trigger blanking circuit comprises:
   a first capacitor that is charged during the conduction time of the synchronous rectifier in a first switching cycle;
   a second capacitor that stores a peak charge of the first capacitor in the first switching cycle; and
   a comparator circuit that compares the peak charge of the first capacitor stored in the second capacitor to a sampled charge of the first capacitor in a second switching cycle following the first switching cycle.

15. The SR driver of claim 14, wherein the comparator circuit, in the second switching cycle, compares the sampled charge of the first capacitor to half of the peak charge of the first capacitor.

16. A method of controlling a synchronous rectifier, the method comprising:
   turning ON a synchronous rectifier in a first switching cycle;
   turning OFF the synchronous rectifier in the first switching cycle;
   turning ON the synchronous rectifier in a second switching cycle that follows the first switching cycle; and
   in the second switching cycle, preventing the synchronous rectifier from being turned OFF for a blanking time that is adaptively set based on a conduction time of the synchronous rectifier in the first switching cycle.

17. The method of claim 16, wherein the blanking time is adaptively set to be 50% of the conduction time of the synchronous rectifier in the first switching cycle.

18. The method of claim 16, further comprising:
   charging a first capacitor during conduction of the synchronous rectifier in the first switching cycle;
   storing in a second capacitor a peak charge of the first capacitor in the first switching cycle; and
   comparing a charge stored in the second capacitor in the first switching cycle to a charge stored in the first capacitor in the second switching cycle to set the blanking time.

19. The method of claim 18, wherein the synchronous rectifier is turned OFF in the first switching cycle when the drain-to-source voltage of the synchronous rectifier increases above a turn-off threshold.

20. The method of claim 19, further comprising:
   turning OFF the synchronous rectifier after expiration of the blanking time in the second switching cycle.

\* \* \* \* \*